(12) United States Patent
Gram

(10) Patent No.: US 7,081,222 B2
(45) Date of Patent: Jul. 25, 2006

(54) PROCEDURE AND MACHINERY FOR THE MOLDING AND ASSEMBLING OF AN ASSEMBLED OBJECT

(76) Inventor: Jes Tougaard Gram, Bishop Svanes Vej, 5, Birkerød (DK) 3460

( * ) Notice: Subject to any disclaimer, the term of this patent is extended or adjusted under 35 U.S.C. 154(b) by 37 days.

(21) Appl. No.: 10/415,281

(22) PCT Filed: Oct. 23, 2001

(86) PCT No.: PCT/DK01/00699

§ 371 (c)(1),
(2), (4) Date: Apr. 28, 2003

(87) PCT Pub. No.: WO02/36319

PCT Pub. Date: May 10, 2002

(65) Prior Publication Data

US 2004/0033287 A1    Feb. 19, 2004

(30) Foreign Application Priority Data

Oct. 26, 2000    (DK)    ................... 2000 01605

(51) Int. Cl.
*B29C 45/04*    (2006.01)
(52) U.S. Cl. ............. 264/234; 264/250; 264/255; 264/328.8; 425/588
(58) Field of Classification Search ............ 425/233, 425/395, 404, 446, 508, 515, 520, 576, 588; 264/234, 250, 254, 255, 259, 328.1, 328.8; 156/500
See application file for complete search history.

(56) References Cited

U.S. PATENT DOCUMENTS 2,478,812 A * 8/1949 Drake .................... 65/156
3,825,457 A * 7/1974 Holroyd et al. ............. 156/147
4,408,980 A * 10/1983 Gallizia ..................... 425/501
4,744,741 A * 5/1988 Glover et al. ............... 425/133

FOREIGN PATENT DOCUMENTS

| JP | 10314343 | 12/1998 |
| JP | 2001205681 | 7/2001 |
| WO | WO 98/35808 | * 8/1998 |
| WO | WO98/38021 | 9/1998 |
| WO | WO00/73040 | 12/2000 |

* cited by examiner

*Primary Examiner*—Donald Heckenberg

(57) ABSTRACT

The invention concerns a procedure and a machinery for molding and assembling of at least two part objects (4) and (8) of plastics, e.g. two ball shells, which can be assembled to a hollow ball (4+8), as molding and assembly can take place in same tool and continuously in the same work procedure. This can be realized by the two turnable middle parts (6) and (6') of the tool, respectively are supplied with the mold cavities (5) and (7), where the assembling of the part objects (4) and (8) can take place, when the respective tool cavities meet during the rotation, at the same time as the closing of the mold. During the closing there can simultaneously be molded new part objects (4") and (8") in the opposite placed mold cavities (5") and (7") in the two turnable mold part (6) and (6'). If it is necessary in respect of the material or the design of the part objects, there can after the molding of the part objects be applied e.g. heat on the respective boundary surfaces, which shall shape the assembling. This can suitably be fit into the steps, which the turnable middle parts (6) and (6') run through. The part objects (4) and (8) can possibly as well as be assembly by a snap- or click function, which is a pure mechanical assembling.

10 Claims, 4 Drawing Sheets

PROCEDURE AND MACHINERY FOR THE MOLDING AND ASSEMBLING OF AN ASSEMBLED OBJECT

BACKGROUND OF THE INVENTION

1. Field of the Invention

Figure 1:
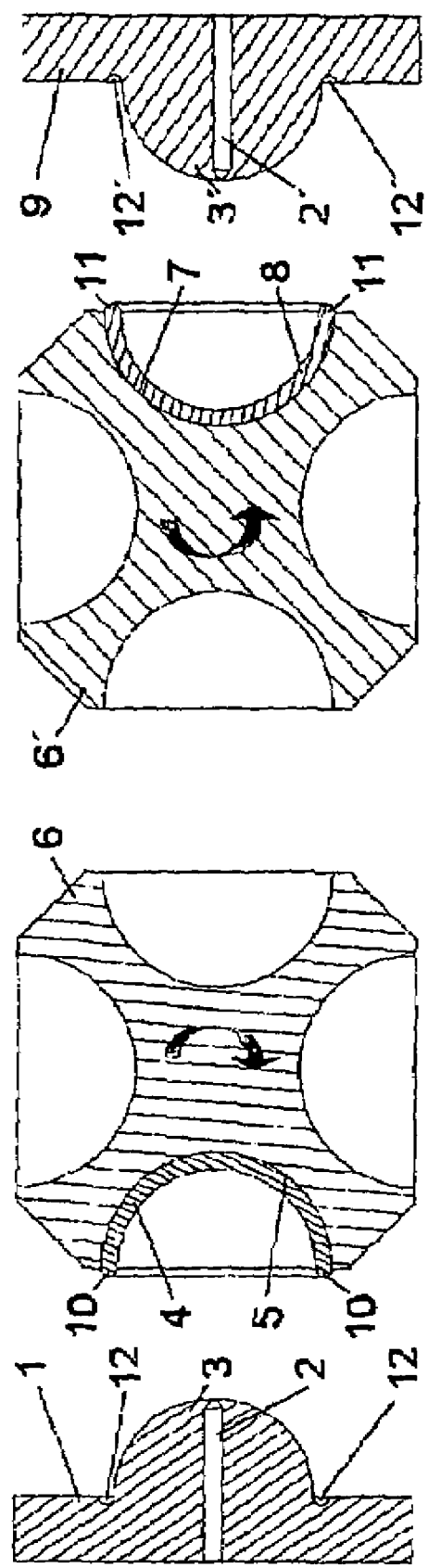

The invention concerns a procedure and machinery for molding and assembling of an in at least two part objects molded object preferably of plastics in a tool comprising at least one turnable and/or displaceable middle part.

2. Description of the Related Art

There is known other procedures and machineries for the molding and assembling of plastic parts in tools with a turnable middle part. Thus there in my international patent application PCT No. DK/98/00034 are described turnable middle parts, which enables the use of the so called stack molding technique in multi component molding, where you mold assembled plastic parts.

For plastic objects, which normally cannot be molded with a cavity because of the shape of the core or of complicated geometries, you have at injection molding normally molded the object in two halves and assembled them afterwards outside the molding machine.

The hitherto known procedures and machineries for assembling or molding of such objects normally involve, that you apply assembling- and welding machines to achieve these objects with cavities, where it is not possible to achieve the desired geometries in another way than by using e.g. various blow molding techniques.

BRIEF SUMMARY OF THE INVENTION

The procedure and the machinery according to the invention is intended to combine the above mentioned technology with the likewise known assembling technique, but here in one and the same tool, whereby there can be achieved large improvements of productivity.

The procedure according to the invention is characterized by the fact, that there in at least one of the boundary surfaces between the parts of the tool, which are furnished with turnable/displaceable tool cavities and/or cores, occurs an assembling of the parts e.g. by welding or another kind of assembling of at least two parts of the in the tool molded object(s).

A more precise account for the benefits by the procedure and machinery according to the invention will appear from the description and the drawing, where

BRIEF DESCRIPTION OF THE DRAWING FIGURES

Figure 2:
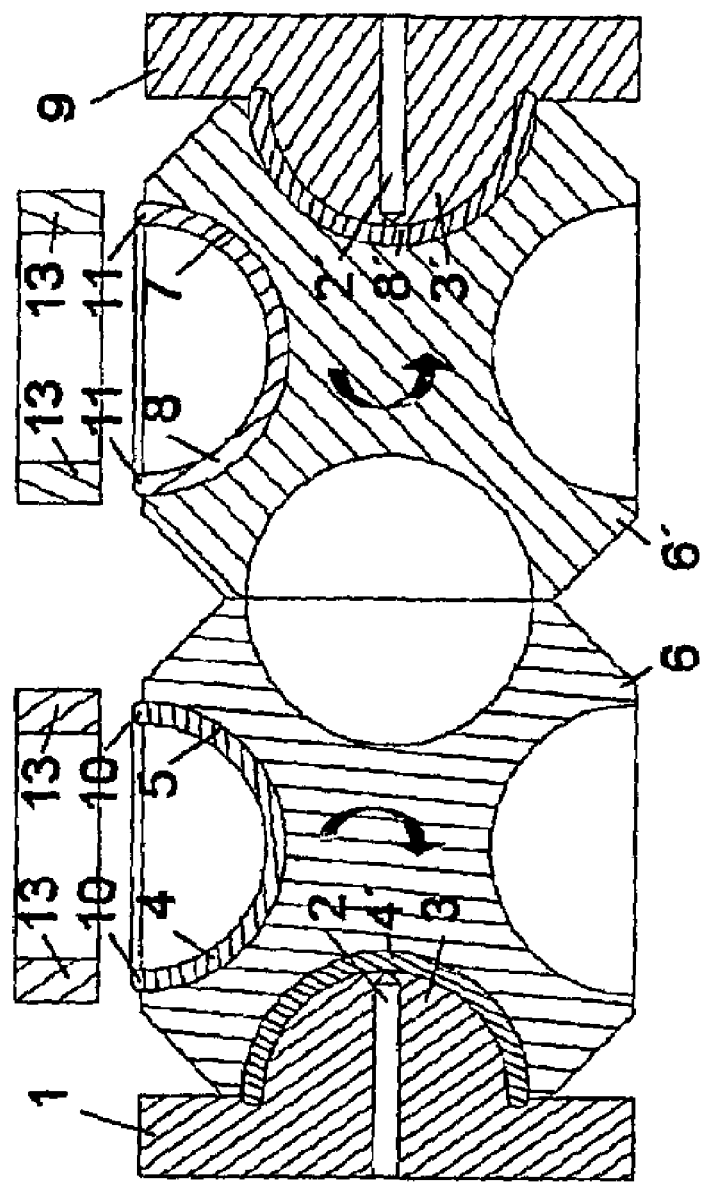
Figure 3:
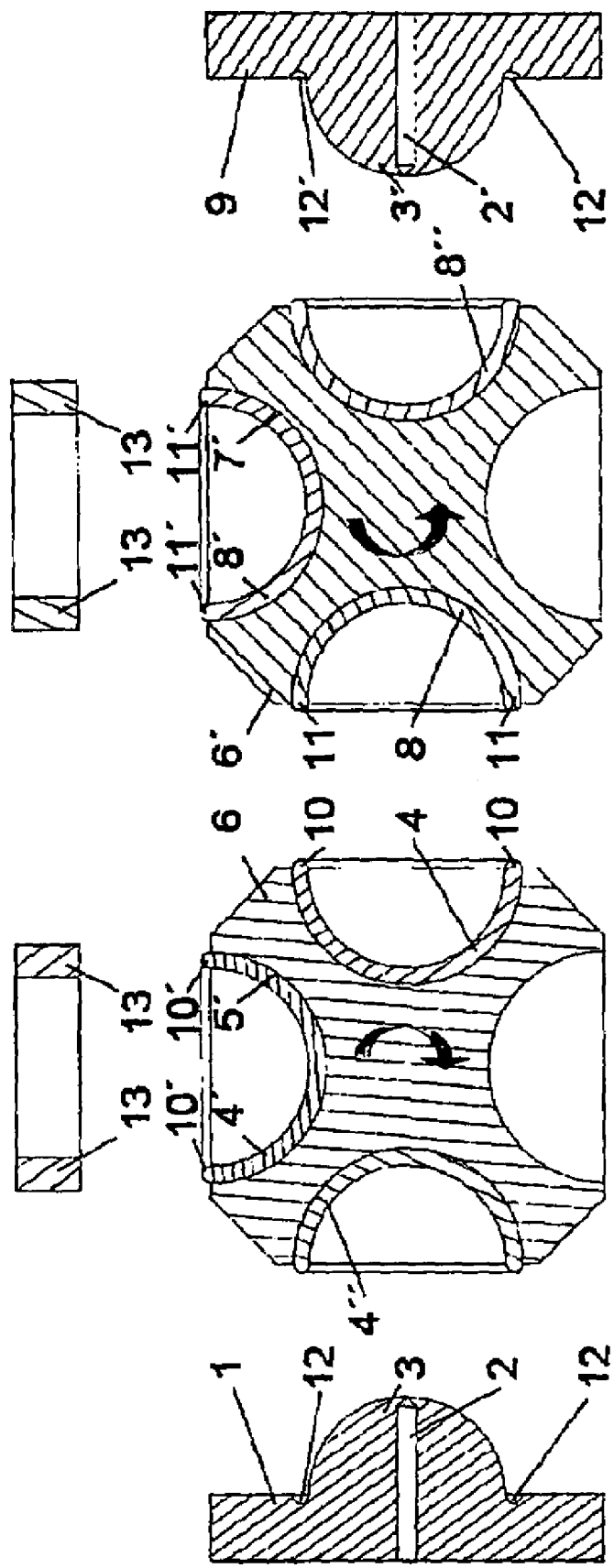
Figure 4:
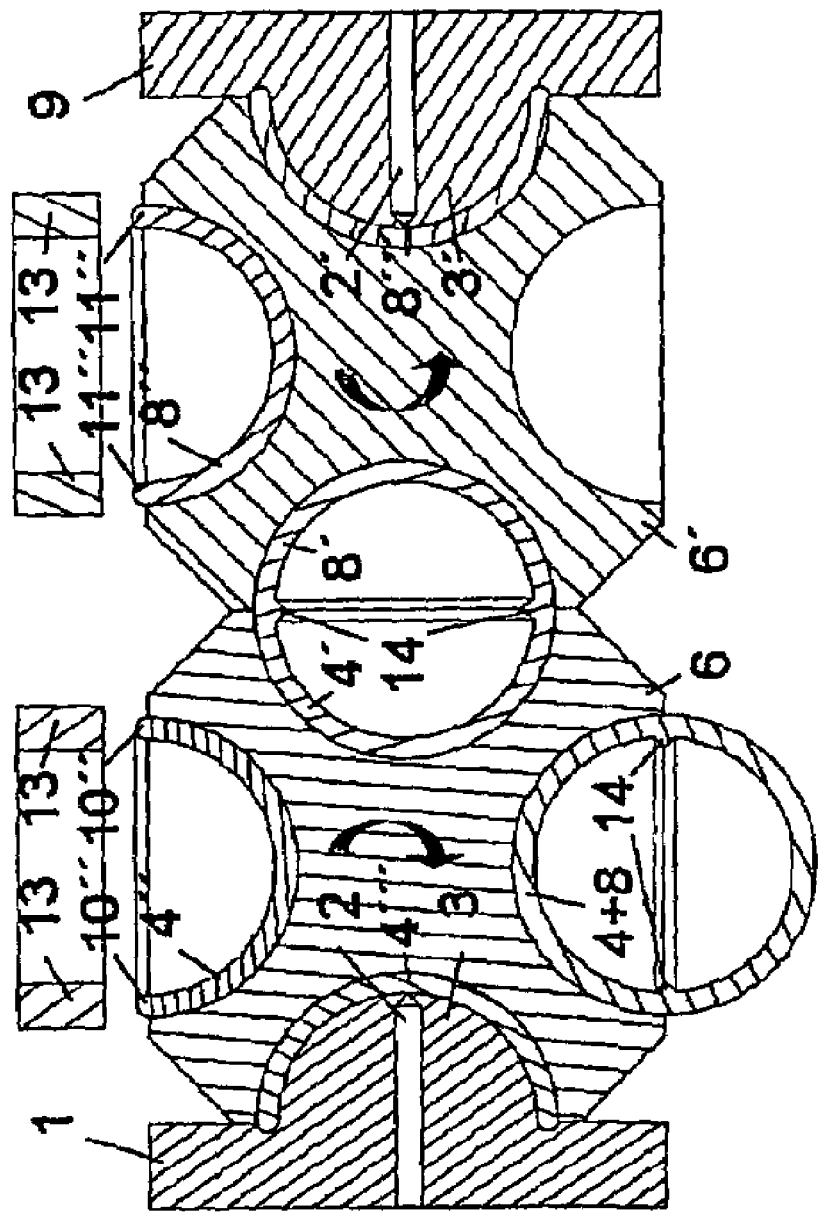

FIG. 1 shows a cross section of the tool according to the invention seen from above, FIG. 2 shows the same, where the turnable middle part is turned 90 degrees in the direction of the arrow, FIG. 3 shows the same, where the middle part is turned additional 90 degrees, and FIG. 4 shows the same, where the middle part is turned another additional 90 degrees.

DETAILED DESCRIPTION OF THE PREFERRED EMBODIMENTS

On FIG. 1 is, seen from above, shown a section of a tool for the exercise of the procedure according to the invention. From the left is seen the stationary tool part 1 with a hot-runner furnished inlet 2, which directs the material further through the core 3. The tool is on the figure just opened after the first part object 4 is molded in the cavity 5 in the left of the two turnable middle parts 6 through the inlet 2 and the core 3. At the same time there is in the cavity 7 in the right of the two turnable middle parts 6' molded another part object 8 with material from that with the inlet 2' and the core 3' furnished movable mold part 9. The two part objects 4 and 8 consist on the drawing of two uniform half ball shaped shells, that later is intended to be put together to a hollow ball. It will be noticed, that this assembling will be eased by the outermost boundary surfaces 10 and 11 on the respective part objects 4 and 8 exceed out from the turnable middle parts. This is accomplished by there are similar undercuts 12 and 12' in respectively the stationary mold part 1 and the movable mold part 9. As it appears from the figure both the turnable middle parts 6 and 6', which in principle has a square formed section, have got their corners removed, so that they require a lesser opening of the tool for being able to turn around. Finally shall be mentioned, that identical cross sections of the on the figure showed can be seen e.g. five places underneath the shown, if the tool is designed for producing in total six assembled objects pr. cycle.

In FIG. 2 is shown the same section, but where the two turnable middle parts 6 and 6' both are turned 90 degrees in the direction of the respective arrows, whereby the two part objects 4 and 8 have reached the on the figure highest position. Here heat is applied on their respectively boundary surfaces 10 and 11 from the movable heat units 13. The tool is meanwhile preferably closed, and the two subsequent part objects 4' and 8' are just being molded through the two inlets 2 and 2' and the cores 3 and 3' in respectively the stationary mold part 1 and the movable mold part 9.

FIG. 3 shows the same section, where the two turnable middle parts 6 and 6' both are turned additional 90 degrees in the direction of the respective arrows. The tool is here open, but moving towards closing, where the two part objects 4 and 8 will approach their two respective heated boundary surfaces 10 and 11 to each other before the welding together. The two following part objects 4' and 8' are now in their on the figure highest position, where they are receiving heat on their respective boundary surfaces 10' and 11' from the movable heat units 13. Finally the third set of part objects 4" and 8" are just being molded in the mold cavities 5" and 7", both the part objects are finished and ready for being turned away from their respective cores 3 and 3'.

On FIG. 4 the two turnable middle parts 6 and 6' are turned another additional 90 degrees. Here the tool is closed, and the two part objects 4 and 8 now are melted together to the finished object, the hollow ball 4+8, which on the figure just is being ejected from the tool. It is noticed, that possible surplus material 14 suitably only exists on the inner side of the ball shell. The two following part objects 4' and 8' are here seen during the welding of their boundary surfaces 10' and 11' in the closed mold, and the third set of part objects 4" and 8" is getting their respective boundary surfaces 10" and 11" heated by the movable heating units 13. Finally has the fourth set of part objects 4''' and 8''' just been molded at their respective cores 3 and 3'.

Hereby the first sequence of the two turnable middle parts 6 and 6' is terminated. By the next turning of 90 degrees a new molding- and assembling cycle is started, as the first, where all four sides of each of the two turnable middle parts 6 and 6' are in full function. Hereafter a continuous production of part objects and the assembling hereof can continue after the same principles.

The on the drawing shown is just a single example of how the procedure and the machinery of the invention can be realized. This should however be sufficient to show the fundamental principles of the invention.

However there could also have been shown other versions of the procedure and the machinery according to the invention. Thus could the two object parts after their assembling a bottle or another kind of container. This can be realized by the turnable middle parts in stead of the on the drawing shown cavities have outgoing cores/core parts, which could make the design of the opening of the bottle. It will likewise be seen, that more technical objects with a difficult geometry preferably could be produced after the procedure according to the invention, which in all respects provides entire new possibilities for the designing of molded objects.

It shall also be noticed that the on the drawing shown step by applying heat possibly can be avoided, if e.g. the material, the design of the object or the velocity of the movement allows this. This is e.g. also the case, if the part objects solely have to be assembled by a pure mechanical assembling, such as a snap- or click function. E.g. in stead of the step in the movement, where heat is applied, the part objects can be supplied with other things, such as electronics, fluid or metal parts, which shall be included in the assembled object.

The invention claimed is:

1. A process for the molding and assembling of a two-part plastic object, the process comprising the steps of:
   providing a machine including first and second rotatable molds, each mold having at least two mold cavities formed therein, and each of said molds having and rotatable on a substantially vertically orientated axis of rotation;
   introducing plastic into one of said mold cavities in said first rotatable mold, to form a part, at a first forming position located at a distal facing side of said first rotatable mold;
   introducing plastic into one of said mold cavities in said second rotatable mold, to form a part, at a second forming position located at a distal facing side of said second rotatable mold;
   rotating said rotatable molds; and
   joining parts in opposing mold cavities at an assembly position when one of said mold cavities of said first mold and one of said mold cavities of said second mold are aligned intermediate to said axes of rotation;
   wherein the at least two mold cavities in each mold enables said parts to be simultaneously formed at said forming positions and assembled together at said assembly position.

2. The process of claim 1 wherein the steps of introducing plastic at the forming position and joining opposing parts at the assembly position are performed simultaneously, and repeatedly between rotating steps, to continuously produce multiple objects.

3. The process of claim 1 further including the step of applying heat to an edge of the part before the joining step.

4. The process of claim 1 further including the step of ejecting a finished object from said mold cavities after the joining step.

5. The process of claim 1 further including the step of moving at least one of said molds in a transverse direction perpendicular to said axis of rotation, during the joining step, to close together the molds at said assembly position.

6. A process for the molding and assembling of a two-part plastic object, the process comprising the steps of:
   providing a machine including first and second rotatable molds, each mold having at least two mold cavities formed therein, and each of said molds having and rotatable on an axis of rotation;
   introducing plastic into one of said mold cavities in said first rotatable mold, to form a part, at a first forming position located at a distal facing side of said first rotatable mold aligned with said axes of rotation;
   introducing plastic into one of said mold cavities in said second rotatable mold, to form a part, at a second forming position located at a distal facing side of said second rotatable mold aligned with said axes of rotation;
   rotating said rotatable molds; and
   joining parts in opposing mold cavities at an assembly position when one of said mold cavities of said first mold and one of said mold cavities of said second mold are aligned intermediate to said axes of rotation;
   wherein the at least two mold cavities in each mold enables said parts to be simultaneously formed at said forming positions and assembled together at said assembly position.

7. The process of claim 6 wherein the steps of introducing plastic at the forming position and joining opposing parts at the assembly position are performed simultaneously, and repeatedly between rotating steps, to continuously produce multiple objects.

8. The process of claim 6 further including the step of applying heat to an edge of the part before the joining step.

9. The process of claim 6 further including the step of ejecting a finished object from said mold cavities after the joining step.

10. The process of claim 6 further including the step of moving at least one of said molds in a transverse direction perpendicular to an axis of rotation of the movable mold, during the joining step, to close together the molds at said assembly position.

* * * * *

(12) EX PARTE REEXAMINATION CERTIFICATE (6253rd)
United States Patent
Gram

(10) Number: US 7,081,222 C1
(45) Certificate Issued: Jun. 10, 2008

(54) PROCEDURE AND MACHINERY FOR THE MOLDING AND ASSEMBLING OF AN ASSEMBLED OBJECT

(76) Inventor: Jes Tougaard Gram, Bishop Svanes Vej, 5, Birkerød (DK), 3460

Reexamination Request:
No. 90/008,126, Jul. 26, 2006

Reexamination Certificate for:
Patent No.: 7,081,222
Issued: Jul. 25, 2006
Appl. No.: 10/415,281
Filed: Apr. 28, 2003

(22) PCT Filed: Oct. 23, 2001
(86) PCT No.: PCT/DK01/00699
§ 371 (c)(1), (2), (4) Date: Apr. 28, 2003
(87) PCT Pub. No.: WO02/36319
PCT Pub. Date: May 10, 2002

(30) Foreign Application Priority Data
Oct. 26, 2000 (DK) .......................... 2000 01605

(51) Int. Cl.
*B29C 45/04* (2006.01)

(52) U.S. Cl. .............. 264/234; 264/250; 264/255; 264/328.8; 425/588
(58) Field of Classification Search .............. None
See application file for complete search history.

(56) References Cited

U.S. PATENT DOCUMENTS

| | | | | |
|---|---|---|---|---|
| 1,942,993 A | * | 1/1934 | Aultman et al. | 156/147 |
| 2,949,696 A | * | 8/1960 | Easterling | 446/462 |
| 2,956,611 A | * | 10/1960 | Jendrisak et al. | 156/73.5 |
| 3,825,457 A | * | 7/1974 | Holroyd et al. | 156/147 |
| 4,744,741 A | * | 5/1988 | Glover et al. | 425/123 |
| 5,015,425 A | * | 5/1991 | Mimata et al. | 264/39 |
| 5,112,556 A | * | 5/1992 | Miller | 264/279 |
| 5,268,183 A | * | 12/1993 | Garza | 425/116 |
| 5,358,397 A | * | 10/1994 | Ligon et al. | 425/145 |
| 6,322,738 B1 | * | 11/2001 | Sicilia et al. | 264/255 |
| 6,386,849 B1 | * | 5/2002 | Kroeger et al. | 425/112 |
| 6,393,992 B1 | * | 5/2002 | Vasel et al. | 102/502 |
| 6,431,543 B1 | * | 8/2002 | Cole et al. | 273/153 R |
| 6,447,280 B1 | * | 9/2002 | Grimm | 425/116 |
| 6,461,141 B1 | * | 10/2002 | Harrison et al. | 425/556 |
| 6,543,365 B1 | * | 4/2003 | Vasel et al. | 102/502 |

(Continued)

FOREIGN PATENT DOCUMENTS

DE    41 23 690 A1    3/2002

OTHER PUBLICATIONS

Translation of DE–4123690A1.*

*Primary Examiner*—Gary L Kunz

(57) ABSTRACT

The invention concerns a procedure and a machinery for molding and assembling of at least two part objects (4) and (8) of plastics, e.g. two ball shells, which can be assembled to a hollow ball (4+8), as molding and assembly can take place in same tool and continuously in the same work procedure. This can be realized by the two turnable middle parts (6) and (6') of the tool, respectively are supplied with the mold cavities (5) and (7), where the assembling of the part objects (4) and (8) can take place, when the respective tool cavities meet during the rotation, at the same time as the closing of the mold. During the closing there can simultaneously be molded new part objects (4") and (8") in the opposite placed mold cavities (5") and (7") in the two turnable mold part (6) and (6'). If it is necessary in respect of the material or the design of the part objects, there can after the molding of the part objects be applied e.g. heat on the respective boundary surfaces, which shall shape the assembling. This can suitably be fit into the steps, which the turnable middle parts (6) and (6') run through. The part objects (4) and (8) can possibly as well as be assembly by a snap- or click function, which is a pure mechanical assembling.

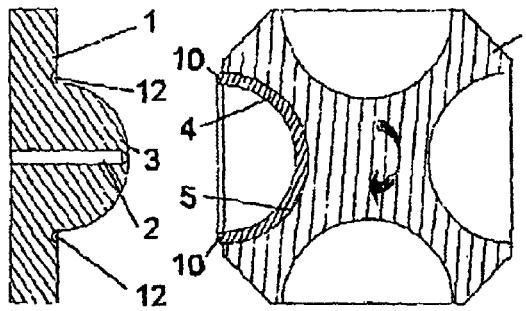
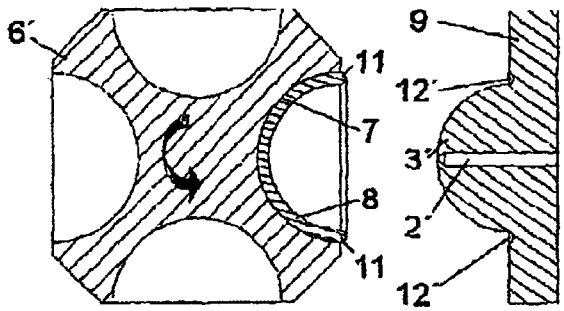

U.S. PATENT DOCUMENTS

| | | | |
|---|---|---|---|
| 6,702,469 B1 * | 3/2004 | Taniguchi et al. | 384/418 |
| 7,128,553 B2 * | 10/2006 | Shakal | 425/190 |
| 7,165,964 B2 * | 1/2007 | Schuessler | 425/429 |
| 2001/0009307 A1 * | 7/2001 | Abrams et al. | 264/40.5 |
| 2002/0039602 A1 * | 4/2002 | Marshall et al. | 425/116 |
| 2002/0129728 A1 * | 9/2002 | Vasel et al. | 102/502 |
| 2003/0047105 A1 * | 3/2003 | Vasel et al. | 102/502 |
| 2004/0033287 A1 * | 2/2004 | Gram | 425/515 |
| 2005/0066841 A1 * | 3/2005 | Vasel et al. | 102/502 |
| 2006/0093699 A1 * | 5/2006 | Arakelyan | 425/541 |

* cited by examiner

US 7,081,222 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patentable as amended.

Claims 2–5 and 7–10, dependent on an amended claim, are determined to be patentable.

New claims 11–16 are added and determined to be patentable.

1. A process for the molding and assembling of a two-part plastic object, the process comprising the steps of:
providing a machine including first and second rotatable molds, each mold having at least two mold cavities formed therein, and each of said molds having and rotatable on a substantially vertically orientated axis of rotation;
introducing plastic into one of said mold cavities in said first rotatable mold, to form a part, at a first forming position located at a distal facing side of said first rotatable mold;
introducing plastic into one of said mold cavities in said second rotatable mold, to form a part, at a second forming position located at a distal facing side of said second rotatable mold;
rotating said rotatable molds; and
joining parts in opposing mold cavities at an assembly position when one of said mold cavities of said first mold and one of said mold cavities of said second mold are aligned intermediate to said axes of rotation;
wherein the at least two mold cavities in each mold enables said parts to be simultaneously formed at said forming positions and assembled together at said assembly position *by a purely mechanical assembly of said parts*.

6. A process for the molding and assembling of a two-part plastic object, the process comprising the steps of:
providing a machine including first and second rotatable molds, each mold having at least two mold cavities formed therein, and each of said molds having and rotatable on an axis of rotation;
introducing plastic into one of said mold cavities in said first rotatable mold, to form a part, at a first forming position located at a distal facing side of said first rotatable mold aligned with said axes of rotation;
introducing plastic into one of said mold cavities in said second rotatable mold, to form a part, at a second forming position located at a distal facing side of said second rotatable mold aligned with said axes of rotation;
rotating said rotatable molds; and
joining parts in opposing mold cavities at an assembly position when one of said mold cavities of said first mold and one of said mold cavities of said second mold are aligned intermediate to said axes of rotation;
wherein the at least two mold cavities in each mold enables said parts to be simultaneously formed at said forming positions and assembled together *by a purely mechanical assembly of said parts* at said assembly position.

*11. A process for the molding and assembling of a two-part plastic object, the process comprising the steps of:*
*providing a machine including first and second rotatable molds, each mold having at least two mold cavities formed therein, and each of said molds having, and being rotatable on, a substantially vertically orientated axis of rotation;*
*introducing plastic into one of said mold cavities in said first rotatable mold, to form a first part, at a first forming position located at a distal facing side of said first rotatable mold;*
*introducing plastic into one of said mold cavities in said second rotatable mold, to form a second part, at a second forming position located at a distal facing side of said second rotatable mold;*
*rotating said first rotatable mold ninety degrees about its axis and rotating said second rotatable mold ninety degrees about its axis;*
*after the first and second rotatable molds are rotated, applying heat to an edge of the first part and the second part;*
*after the step of applying heat to an edge, rotating said first rotatable mold an additional ninety degrees about its axis and rotating said second rotatable mold an additional ninety degrees about its axis;*
*joining parts in opposing mold cavities at an assembly position when one of said mold cavities of said first mold and one of said mold cavities of said second mold face each other;*
*wherein the at least two mold cavities in each mold enables said parts to be simultaneously formed at said forming positions and assembled together at said assembly position.*

*12. The process of claim 11 wherein said first rotatable mold is rotating clockwise about its axis and the second rotatable mold is rotating counterclockwise about its axis.*

*13. The process of claim 11 further including the steps of introducing in said first rotatable mold a component selected from the group consisting of electronic components, fluid components and metal components and combining said component with the first part to form a finished product.*

*14. A process for the molding and assembling of a two-part plastic object, the process comprising the steps of:*
*providing a machine including first and second rotatable molds, each mold having at least two mold cavities formed therein, and each of said molds having, and being rotatable on, an axis of rotation;*
*introducing plastic into one of said mold cavities in said first rotatable mold, to form a part, at a first forming position located at a distal facing side of said first rotatable mold aligned with said axes of rotation;*
*introducing plastic into one of said mold cavities in said second rotatable mold, to form a part, at a second forming position located at a distal facing side of said second rotatable mold aligned with said axes of rotation;* rotating said first rotatable mold ninety degrees about its axis of rotation and rotating said second rotatable mold ninety degrees about its axis of rotation;

after the first and second rotatable molds are rotated, applying heat to an edge of the parts in the corresponding rotatable molds;

after the step of applying heat to an edge, rotating said first rotatable mold an additional ninety degrees about its axis of rotation and rotating said second rotatable mold an additional ninety degrees about its axis of rotation;

joining parts in opposing mold cavities at an assembly position when one of said mold cavities of said first mold and one of said mold cavities of said second mold are aligned intermediate to said axes of rotation;

wherein the at least two mold cavities in each mold enables said parts to be simultaneously formed at said forming positions and assembled together.

15. The process of claim 14 wherein said first rotatable mold is rotating clockwise about its axis and the second rotatable mold is rotating counterclockwise about its axis.

16. The process of claim 14 further including the steps of introducing in said first rotatable mold a component selected from the group consisting of electronic components, fluid components and metal components and combining said component with the first part to form a finished object.

* * * * *

(12) EX PARTE REEXAMINATION CERTIFICATE (7985th)
United States Patent
Gram

(10) Number: US 7,081,222 C2
(45) Certificate Issued: Jan. 11, 2011

(54) PROCEDURE AND MACHINERY FOR THE MOLDING AND ASSEMBLING OF AN ASSEMBLED OBJECT

(76) Inventor: Jes Tougaard Gram, Bishop Svanes Vej, 5, Birkerød (DK), 3460

Reexamination Request:
No. 90/009,212, Jul. 7, 2008

Reexamination Certificate for:
Patent No.: 7,081,222
Issued: Jul. 25, 2006
Appl. No.: 10/415,281
Filed: Apr. 28, 2003

Reexamination Certificate C1 7,081,222 issued Jun. 10, 2008

(22) PCT Filed: Oct. 23, 2001
(86) PCT No.: PCT/DK01/00699
§ 371 (c)(1),
(2), (4) Date: Apr. 28, 2003
(87) PCT Pub. No.: WO02/36319
PCT Pub. Date: May 10, 2002

(30) Foreign Application Priority Data
Oct. 26, 2000 (DK) .......................... 2000 01605

(51) Int. Cl.
*B29C 45/04* (2006.01)

(52) U.S. Cl. .......................... 264/234; 264/250; 264/255; 264/328.8; 425/588
(58) Field of Classification Search .................. None
See application file for complete search history.

(56) References Cited

U.S. PATENT DOCUMENTS

| 4,295,814 A | 10/1981 | Rosenberg .................. 425/517 |
| 5,915,760 A | 6/1999 | Kawase et al. ................ 29/883 |
| 6,206,681 B1 | 3/2001 | Kawase et al. .............. 425/517 |

FOREIGN PATENT DOCUMENTS

| DE | 0 920 979 | * 6/1999 |
| DE | 41 23 690 A1 | 3/2002 |
| EP | 1 060 868 A1 | 12/2000 |
| JP | 63-135214 | 6/1988 |

* cited by examiner

*Primary Examiner* — Terrence R Till

(57) ABSTRACT

The invention concerns a procedure and a machinery for molding and assembling of at least two part objects (4) and (8) of plastics, e.g. two ball shells, which can be assembled to a hollow ball (4+8), as molding and assembly can take place in same tool and continuously in the same work procedure. This can be realized by the two turnable middle parts (6) and (6') of the tool, respectively are supplied with the mold cavities (5) and (7), where the assembling of the part objects (4) and (8) can take place, when the respective tool cavities meet during the rotation, at the same time as the closing of the mold. During the closing there can simultaneously be molded new part objects (4") and (8") in the opposite placed mold cavities (5") and (7") in the two turnable mold part (6) and (6'). If it is necessary in respect of the material or the design of the part objects, there can after the molding of the part objects be applied e.g. heat on the respective boundary surfaces, which shall shape the assembling. This can suitably be fit into the steps, which the turnable middle parts (6) and (6') run through. The part objects (4) and (8) can possibly as well as be assembly by a snap- or click function, which is a pure mechanical assembling.

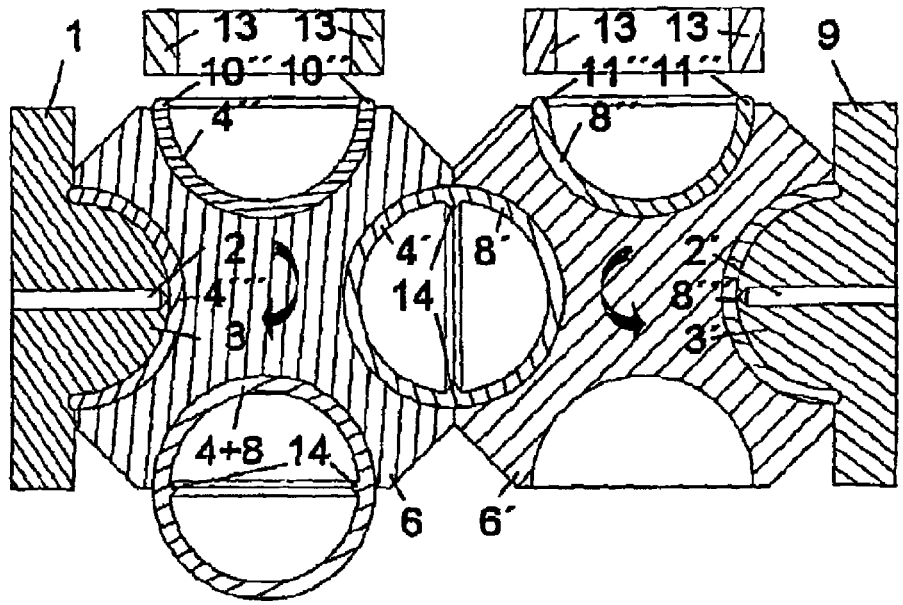

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11-16 is confirmed.

Claims 1 and 6 are determined to be patentable as amended.

Claims 2-5 and 7-10, dependent on an amended claim, are determined to be patentable.

New claim 17 is added and determined to be patentable.

1. A process for the molding and assembling of a two-part plastic object, the process comprising the steps of:
   providing a machine including first and second rotatable molds, each mold having at least two mold cavities formed therein, and [each of] said molds having and *being* rotatable on [a] *respective first and second* substantially vertically oriented [axis] *axes* of rotation, *each of said mold cavities facing radially outward from its respective axis of rotation*;
   introducing plastic into one of said mold cavities in said first rotatable mold, to form a part, at a first forming position located at a distal facing side of said first rotatable mold;
   introducing plastic into one of said mold cavities in said second rotatable mold, to form a part, at a second forming postion located at a distal facing side of said second rotatable mold;
   rotating said rotatable molds; and
   joining parts in opposing mold cavities at an assembly position when one of said mold cavities of said first mold and one of said mold cavities of said second mold are aligned intermediate to said axes of rotation;
   wherein the at least two mold cavities in each mold enables said parts to be simultaneously formed at said forming positions and assembled together at said assembly position by a purely mechanical *direct* assembly of said parts.

6. A process for the molding and assembling of a two-part plastic object, the process comprising the steps of:
   providing a machine including first and second rotatable molds, each mold having at least two mold cavities formed therein, and each of said molds having and *being* rotatable on [an] *a separate* axis of rotation, *each of said mold cavities facing radially outward from its respective axis of rotation*;
   introducing plastic into one of said mold cavities in said first rotatable mold, to form a part, at a first forming position located at a distal facing side of said first rotatable mold aligned with said axes of rotation;
   introducing plastic into one of said mold cavities in said second rotatable mold, to form a part, at a second forming position located at a distal facing side of said second rotatable mold aligned with said axes of rotation;
   rotating said rotatable molds; and
   joining parts in opposing mold cavities at an assembly position when one of said mold cavities of said first mold and one of said mold cavities of said second mold are aligned intermediate to said axes of rotation;
   wherein the at least two mold cavities in each mold enables said parts to be simultaneously formed at said forming positions and assembled together by a purely mechanical *direct* assembly of said parts at said assembly position.

17. *A process for the molding and assembling of a two-part plastic object, the process comprising the steps of:*
   *providing first and second rotatable molds, each mold having at least two mold cavities formed therein, and said molds having and rotatable on respective parallel axes of rotation;*
   *introducing plastic into one of said mold cavities in said first rotatable mold to form a first part at a first forming position at a distal facing side of said first rotatable mold;*
   *introducing plastic into one of said mold cavities in said second rotatable mold to form a second part at a second forming position at a distal facing side of said second rotatable mold;*
   *rotating each rotatable mold one hundred eighty degrees about its respective axis to an assembly position where one of said mold cavities of said first mold and one of said mold cavities of said second mold are aligned intermediate to said axes of rotation;*
   *joining said first and second parts in opposing mold cavities into an assembled part at said assembly position;*
   *rotating each rotatable mold ninety degrees about its respective axis past said assembly position to an ejection position whereat said assembled part is retained in one of said rotatable molds; and*
   *ejecting said assembled part from said rotatable mold in said ejection position;*
   *wherein the formation, assembly and ejection of different parts may occur simultaneoulsy.*

* * * * *